Figure 4:
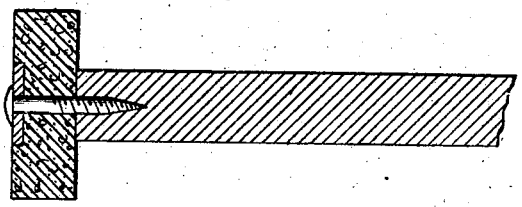

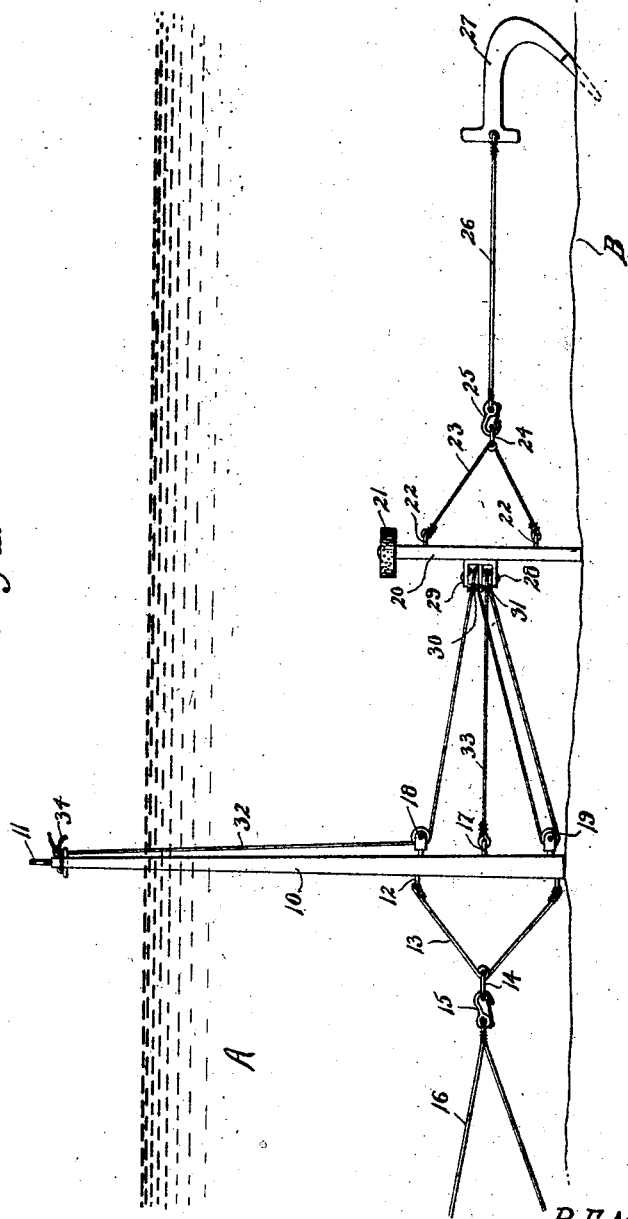

March 10, 1925.

R. E. McCOY ET AL 1,529,545

NET HANDLING DEVICE

Filed Oct. 3, 1924

2 Sheets-Sheet 2

R.E. McCoy
B.E. Trombley.
INVENTOR

BY Victor J. Evans.
ATTORNEY

WITNESS:

Patented Mar. 10, 1925.

1,529,545

UNITED STATES PATENT OFFICE.

ROY EDWARD McCOY AND BERTRAM EDWIN TROMBLEY, OF BAY CITY, MICHIGAN.

NET-HANDLING DEVICE.

Application filed October 3, 1924. Serial No. 741,452.

*To all whom it may concern:*

Be it known that we, ROY EDWARD McCOY and BERTRAM EDWIN TROMBLEY, citizens of the United States, residing at Bay City, in the county of Bay and State of Michigan, have invented new and useful Improvements in Net Handling Devices, of which the following is a specification.

This invention relates to devices for use in connection with fish nets of the trap variety and has for its object the provision of novel means whereby the nets may be pulled taut and held close to the bottom of the body of water in which it is used, the mechanism or apparatus being also capable of manipulation to relieve the strain upon the net when it is desired to withdraw the same from the water.

An important object is the provision of a tensioning or tautening device of this character which is of great value inasmuch as it permits of the holding of the net at a greater depth so that deeper fishing is possible than is ordinarily the case.

More specifically the object of the invention is to provide a tensioning or tautening means including an anchor, an intermediate element connected therewith and a block and tackle mechanism associated with the net and said intermediate element and operable by the occupant of a boat whereby to place the net under tension or to release the tension as the case may be.

An additional object of the invention is the provision of a fish net handling mechanism of this character which will be very simple and inexpensive in manufacture, easy to apply and use, positive in action, efficient and durable in service, and a general improvement in the art.

Figure 3:
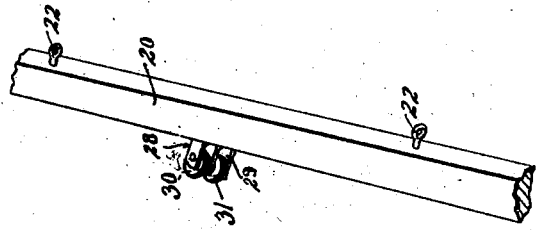
Figure 2:
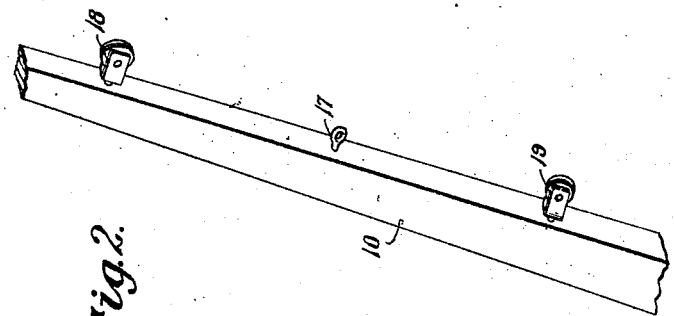

With the above and other objects and advantages in view, the invention consists in the details of construction to be hereinafter more fully described and claimed, and illustrated in the drawings herewith appended in which:

Figure 1 is a view taken vertically through a body of water showing the entire device in position, the net itself being omitted, Figure 2 is a detail view of the main pole device, Figure 3 is a detail view in elevation of the intermediate floating element, and Figure 4 is a detail section therethrough.

Referring more particularly to the drawings, the letter A designates a body of water and B indicates the bottom. In carrying out our invention we provide a main pole 10 which is constructed of any suitable material and which is of any desired dimensions, which pole is designed to be placed vertically in the body of water A with the butt end thereof resting upon the ground or bottom B. At the top of this pole is a suitable eye-bolt, ring or other connection indicated at 11 whereby a boat occupied by the fisherman may be moored temporarily thereto. Secured at one side of the lower end portion of this pole 10 are screw eyes or the like indicated at 12 to which is connected a bridle rope 13 carrying a ring 14 with which is detachably connected a snap or other hook 15 carried by the bridle 16 of the trap net, not shown, at the opposite side of the lower portion of this pole is a screw eye or other equivalent element 17 above and below which are mounted pulley blocks 18 and 19.

In addition to the main pole above described, we employ an intermediate or auxiliary pole member 20 which is intended to float vertically within the water near the bottom and which is consequently provided at its upper end with a cork or other float indicated at 21 held thereon in any desired manner. At one side of this intermediate member are screw eyes or equivalent fastening elements 22 with which are connected the ends of a bridle rope 23 which preferably carries a ring or the like 24 detachably connected by a snap or other hook 25 with one end of an anchor line 26 which is secured to an anchor 27 in the ordinary or preferred type.

Secured upon the intermediate portion of the member 20 at a point midway of the screw eyes or the like 22 is a pulley block 28 including a suitable frame 29 in which are journaled two rollers 30 and 31. The numeral 32 designates a rope or cable which has its dead end 33 secured to the element 17 and which is trained over the pulley or roller 31, about the pulley in the block 19, over the roller or pulley 30, about the pulley in the block 18 and which will then be brought upwardly and secured at 34 to the upper end to the main pole 10 as clearly shown in Figure 1.

When it is desired to set the net, the bridle rope 13 is connected with the bridle 16 and the bridle 23 is connected with the anchor line 26. The anchor is then dropped overboard and will bite into the bottom in the usual manner, the boat used by the fisherman is then temporarily moored to the top of the main pole 10 at the ring or other element 11 so that the operators may unfasten the rope 32 at the point 34 and tow in until the net is drawn tight. It will be observed that the arrangement of the block and tackle is such that it is a simple matter to draw in the slack line and move the member 11 toward the intermediate member 20 for placing the parts in a taut condition. After the rope has been drawn in to the desired extent it may be secured by a half-hitch. When it is desired to lift the net, the previously made half-hitches should be unfastened and the rope 32 permitted to slacken whereupon the net may be drawn to the surface by pulling upon the pulleys, not shown, commonly provided.

From the foregoing description and a study of the drawings it will be apparent that we have thus provided a simple and inexpensive device for the purpose specified which will efficiently perform all the functions for which it is intended and which will be of great advantage inasmuch as it will facilitate deep fishing.

While we have shown and described the preferred embodiment of the invention, it should be understood that we reserve the right to make such changes in the form, construction and arrangement of parts as will not depart from the spirit of the invention or the scope of the sub-joined claims.

Having thus described the invention, we claim:

1. In a fish net handling device, a main pole adapted to be submerged in a body of water in a vertical position, an intermediate buoyant pole member, an anchor connected with said intermediate member, a bridle carried by the main pole member and adapted for connection with a net, and a block and tackle mechanism connecting the main and intermediate pole members.

2. In a fish net handling device, a main pole adapted to be submerged in a body of water in a vertical position, an intermediate buoyant pole member, an anchor connected with said intermediate member, a bridle carried by the main pole member and adapted for connection with a net, and a block and tackle mechanism connecting the main and intermediate pole members and including a pair of pulleys mounted on the main pole, a block mounted on the intermediate member and including a frame containing a pair of pulleys, and a flexible member having a dead end connected with the lower portion of the main pole and trained about the respective pulleys with its other end detachably connected with the upper end of the main pole.

3. In a net handling device, a main pole adapted to be submerged in a body of water in a vertical position, a bridle carried by the lower end of said main pole and adapted for connection with a net bridle, an intermediate pole member carrying a float whereby to be buoyant and normally remain suspended in vertical position, a bridle carried by said intermediate pole member, an anchor detachably connected with said last named bridle, pulleys on the lower portion of the main pole, a block on the central portion of the intermediate pole and a rope trained about the pulleys and block and having its dead end connected with the lower end of the main pole.

In testimony whereof we affix our signatures.

BERTRAM EDWIN TROMBLEY.
ROY EDWARD McCOY.